US011354515B2

(12) United States Patent
Zhang et al.

(10) Patent No.: US 11,354,515 B2
(45) Date of Patent: Jun. 7, 2022

(54) DISCOVERY AND RECOMMENDATION OF ONLINE LEARNING RESOURCES

(71) Applicant: salesforce.com, inc., San Francisco, CA (US)

(72) Inventors: Yang Zhang, Arlington, MA (US); Jason Paul Kovalski, Boston, MA (US)

(73) Assignee: Salesforce, Inc., San Francisco, CA (US)

( * ) Notice: Subject to any disclaimer, the term of this patent is extended or adjusted under 35 U.S.C. 154(b) by 192 days.

(21) Appl. No.: 16/935,149

(22) Filed: Jul. 21, 2020

(65) Prior Publication Data

US 2022/0027562 A1  Jan. 27, 2022

(51) Int. Cl.
*G06F 40/30* (2020.01)
*G06N 3/08* (2006.01)
*G06F 3/0481* (2022.01)
*G06F 40/284* (2020.01)
*G06N 3/04* (2006.01)

(52) U.S. Cl.
CPC ............ *G06F 40/30* (2020.01); *G06F 3/0481* (2013.01); *G06F 40/284* (2020.01); *G06N 3/0454* (2013.01); *G06N 3/088* (2013.01)

(58) Field of Classification Search
CPC ...... G06F 40/30; G06F 3/0481; G06F 40/284; G06N 3/088; G06N 3/0454
See application file for complete search history.

(56) References Cited

U.S. PATENT DOCUMENTS

| | | | |
|---|---|---|---|
| 10,223,616 B1* | 3/2019 | Malin | G06F 40/284 |
| 10,417,350 B1* | 9/2019 | Mohamed | G06N 20/00 |
| 2018/0052849 A1* | 2/2018 | Jagmohan | G06N 20/00 |
| 2018/0052857 A1* | 2/2018 | Jagmohan | G06N 3/0454 |
| 2018/0349114 A1* | 12/2018 | Brown | G06N 20/00 |
| 2018/0350180 A1* | 12/2018 | Onischuk | G07C 13/00 |
| 2019/0012568 A1* | 1/2019 | Kumar | G06V 10/94 |
| 2019/0034785 A1* | 1/2019 | Murray | G06N 3/0454 |
| 2019/0073590 A1* | 3/2019 | Wu | G06F 9/00 |
| 2019/0129732 A1* | 5/2019 | Sivertson | G06N 7/005 |
| 2019/0130305 A1* | 5/2019 | Sivertson | G06N 20/00 |
| 2020/0184383 A1* | 6/2020 | Mehta | G06N 3/006 |
| 2020/0242197 A1* | 7/2020 | Srinivasan | G06N 20/00 |
| 2020/0334520 A1* | 10/2020 | Chen | G06N 3/0472 |
| 2021/0279638 A1* | 9/2021 | Kano | G06K 9/6215 |
| 2021/0326751 A1* | 10/2021 | Liu | G06F 40/20 |
| 2021/0374338 A1* | 12/2021 | Shrivastava | G06F 40/56 |

\* cited by examiner

*Primary Examiner* — Kevin Ky
(74) *Attorney, Agent, or Firm* — Butzel Long

(57) ABSTRACT

A system models web content including learning resources available on a website, and makes suggestions of potentially useful learning resources when a user highlights text of interest within the website. In order to facilitate these suggestions, a neural network-based system is trained on learning resources and other content available on the website to create a common word embedding for learning resources and other website text. A student model may then be created to facilitate real time or near real time suggestions of relevant learning resources in response to selections of text from the website.

20 Claims, 7 Drawing Sheets

US 11,354,515 B2

DISCOVERY AND RECOMMENDATION OF ONLINE LEARNING RESOURCES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to the discovery and recommendation of online learning resources, and more specifically to real time adaptive online discovery and recommendation using neural networks.

BACKGROUND

Learning resources are an important part of many contemporary websites. However, website recommendations for educational material typically rely on labor-intensive and error prone human curation of relevant content, which are presented in Frequent Asked Question (FAQ) documents, static "learn more" links, and the like. There remains a need for dynamic discovery and recommendation of online learning resources for visitors to a website.

SUMMARY

A system models web content including learning resources available on a website, and makes suggestions of potentially useful learning resources when a user highlights text of interest within the website. In order to facilitate these suggestions, a neural network-based system is trained on learning resources and other content available on the website to create a common word embedding for learning resources and other website text. A student model may then be created to facilitate real time or near real time suggestions of relevant learning resources in response to selections of text from the website.

BRIEF DESCRIPTION OF THE DRAWINGS

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein. In the drawings, like reference numerals generally identify corresponding elements.

DETAILED DESCRIPTION

Embodiments will now be described with reference to the accompanying figures. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, for example, the term "or" should generally be understood to mean "and/or."

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "approximately" or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms unless specifically stated to the contrary.

Figure 1:
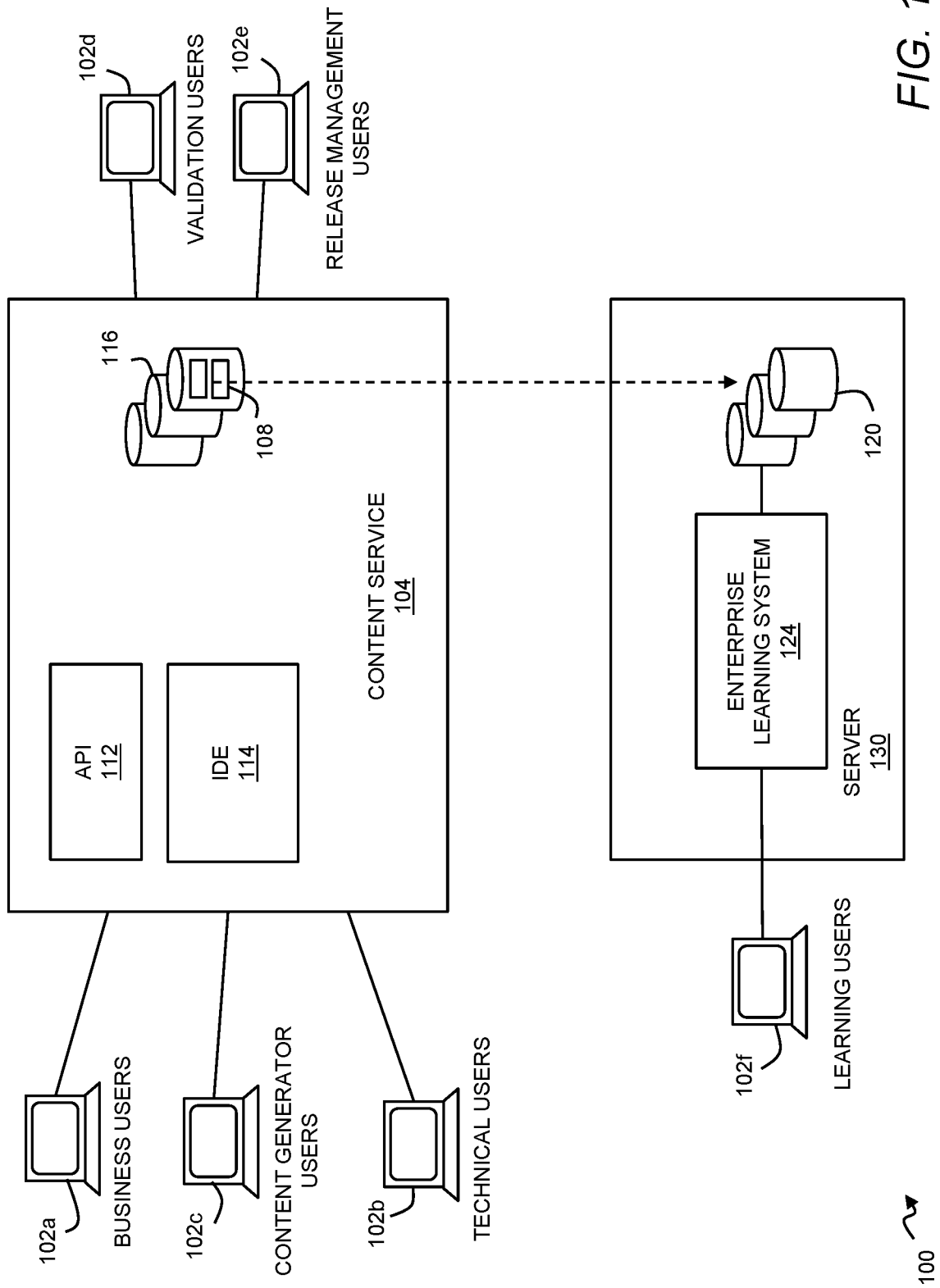
FIG. 1 shows a content creation platform for learning resources.

FIG. 1 shows a content creation platform for learning resources. The system 100 may include a variety of different hardware and/or software components in communication with each other. The system 100 may include a number of users 102a-102f and a content service 104 with an application programming interface ("API") 112, an integrated development environment 114, and a content service database 116 storing data including objects 108 such as learning resources and other content developed with the content service 104. The system 100 may also include an enterprise learning system 124 using a production database 120 of content based on the content service database 116.

Users 102a-102f can include a variety of users associated with a variety of roles and/or permissions. Examples of users may include at least one business user 102a, at least one technical user 102b, at least one content generator user 102c, at least one validation user 102d, and at least one release management user 102e, who may all participate in the creation, review, release and administration of content. In one aspect, content includes learning resources such as educational content for the enterprise learning system. The users may also include at least one learning user 102f who uses learning content from the production database 120 through the enterprise learning system 124. Examples of devices used by users 102a-102f include, but are not limited to a desktop computer or portable electronic device such as a smartphone, a tablet, a laptop, a wearable device such as Google Glass®, another optical head-mounted display (OHMD) device, a smart watch, and so forth.

The content service 104 may support the creation, management, and release of content such as learning resources, and may facilitate communication among the users 102a-102e through any suitable combination of networks and interfaces. The content service 104 may handle and process data requests from users 102a-102e of system 100 related to management of learning resources and other content. For example, content users 102a and 102c can generate educational content objects using the integrated development environment 114 and have those additions/changes stored in the content database 116 (and/or released to the production database 128). In addition, changes may be synchronized with a remote content management system (e.g., Github®) using import/export features of the integrated development environment 114. In some implementations, the content service 104 facilitates the automatic release of hierarchical content objects using release objects. In some implementations, these release objects allow users to modify educational content, add educational content, edit and/or update educational content, update the version of a release object, preview educational content, and so forth.

An authorization service or the like may be used to determine who can build, preview, or publish content using the integrated development environment 114. Multiple modes of access to production content can exist, which can be based on private authorization or public authorization. In still other implementations, a secure asset service can be used to protect intellectual property, e.g., files, images, video, and other media. The APIs 112 can also be used to connect to an external content management system or repository such as Github® for importing/exporting data and metadata. Also or alternatively, a caching layer can be used for quick access to the content in the integrated development environment 114 and making automatic saves to changes to the content of the integrated development environment 114. In some implementations, access to the APIs 112 can be restricted to an appropriate set of users. For example, a user with permission to create new educational content objects would have access to the APIs 112, while a learning user 102f may not.

In some implementations, a user of the enterprise learning system 124 may have two different authorization identities. This can allow multiple modes of access to educational content, which can be based on private authorization or public authorization. For example, one authorization identity can be a set of access credentials based on a profile of an identity platform, e.g., a single sign on platform, a social network platform, a CRM computing platform, etc. The other authorization identity can be a set of access credentials associated with the enterprise learning system 124 or the integrated development environment 114. In some implementations, the enterprise learning system 124 can query the set of access credentials from the identity platform and map those credentials and/or permissions with credentials associated with the enterprise learning system 124. In other implementations, authorization includes two levels of authorization, for instance, functional authorization and record authorization. Functional authorization can include access to one of the APIs 112 to manage the release of release objects, e.g., approval, incomplete, etc. Record authorization can include access to one or more portions of the educational content to be released, e.g., title, name, etc. Record authorization can also control which users can access the educational content on the enterprise learning system 124, e.g., public view and/or private view.

The integrated development environment 114 can include a variety of components to allow for the quick and easy creation of hierarchically arranged educational content objects. The educational content objects can be created declaratively, e.g., unit objects created based on pop up indicators for generating the next unit object in sequence, assessments like multiple choice question quizzes, and hands-on exercises. In addition, integrated development environment 114 can be configured to allow for secure asset integration to keep files, images, or video from being previewed by the public. Educational content objects in progress can be previewed using production web styles applied automatically. Moreover, all changes including those through a rich text editor can be automatically saved to a client-side cache for quick access and manipulation.

While the foregoing description emphasizes the management of learning resources, it will be understood that the system 100 may also or instead be used to manage other content such as website content, social media content, and so forth. This may include public content that is available to general users on the Internet, private content that is available to credentialed users of a private content delivery platform, or some combination of these. Thus, the system 100 may more generally include a server 130 such as a webserver or the like supporting user access to content over a network, e.g., by the learning users 102f, and the production database 120 may more generally include a database of web content such as web pages, video, images, text, and so forth that might be deployed to users over a network using a webserver. For an integrated system, the production database 120 may thus include general web content along with any number of learning resources supporting use or understanding of the web content, and the general web content may also be managed using a content management platform such as the content service 104 described above. The server 130 may be configured to recommend learning resources to users based on user selections of website text or other content.

Figure 2:
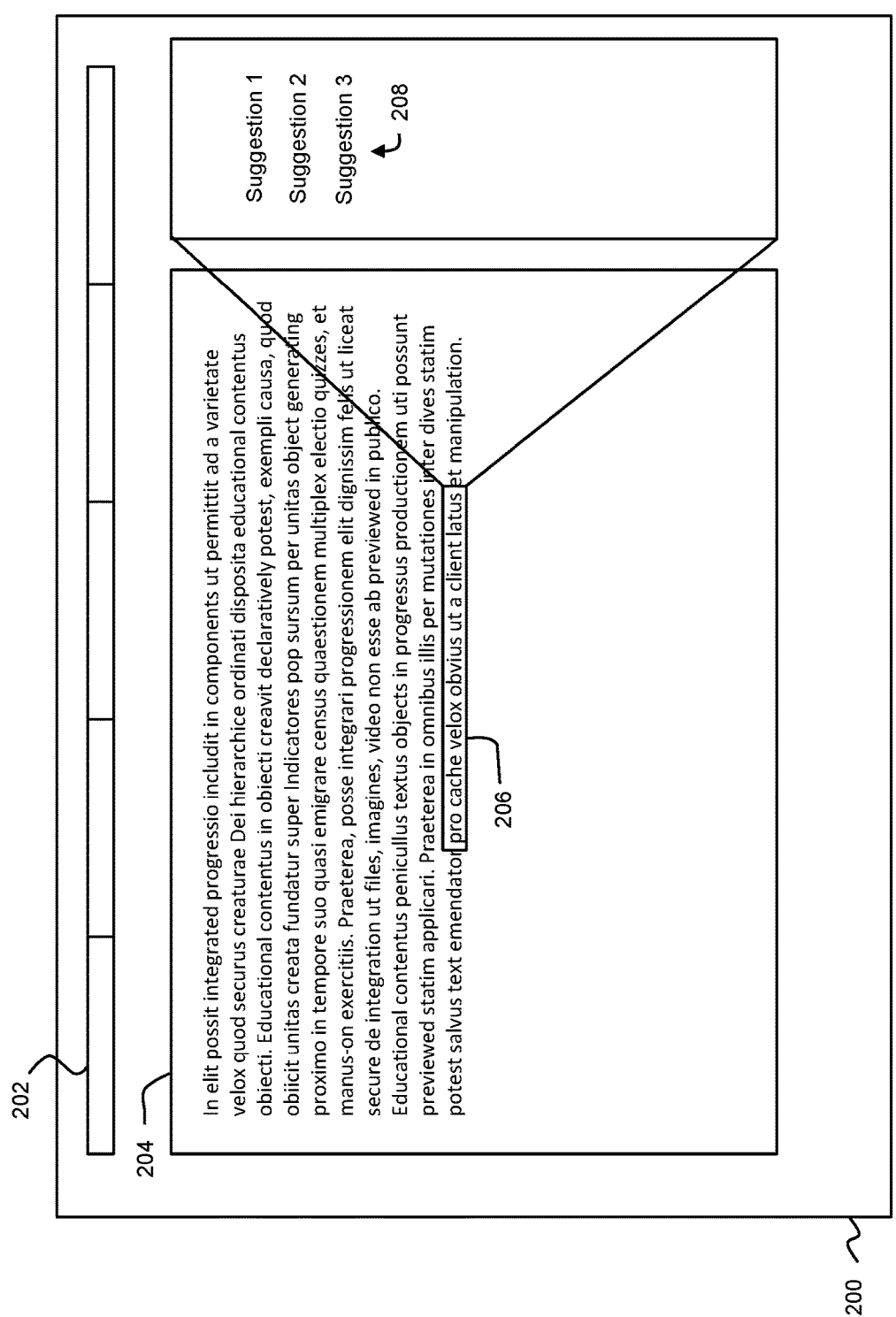
FIG. 2 illustrates a user interface for a website.

FIG. 2 shows a user interface for a website. In general, the user interface 200 may provide a visual, interactive front for users to access content such as web content and the learning resources described herein. While the following description generally contemplates a user interface 200 for a website, it will be understood that other content delivery platforms and/or user interfaces 200 may also or instead be used to support access to content and learning resources as described herein. The user interface 200 may provide a number of controls 202 such as drop-down links, buttons, menus, and so forth for user navigation of, and interaction with, content, along with a window 204 showing text or other content for use by visitors to the website. This may include a private website, a public website, or some combination of these.

As described further herein, a user may highlight a portion of text 206, e.g., with a mouse operation or the like, and interactively request or automatically receive, one or more suggestions 208 for learning resources that may be relevant to the portion of text 206 that has been highlighted by the user. The suggestions may be hyperlinked or otherwise interactively coupled to corresponding learning resources, and may include titles, dates, authors, popularity, or other information related to the learning resources and/or the potential interest of such learning resources to a user.

Figure 3:
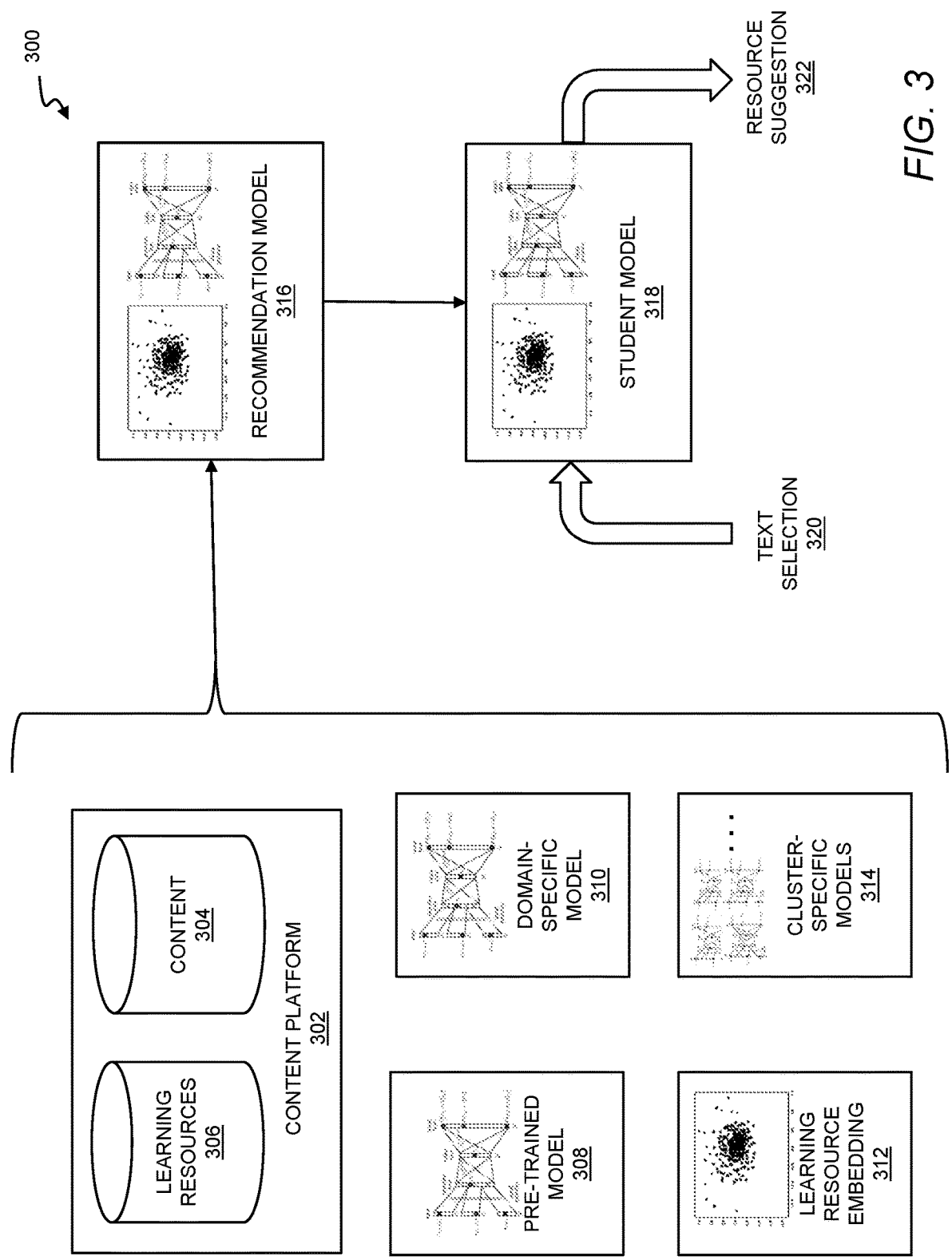
FIG. 3 illustrates the data structures used in a system to recommend learning resources for a website.

FIG. 3 illustrates the data structures used in a system to recommend learning resources for a website. In general, a content platform 302 such as a website may host content 304 such as web content or the like for use by visitors, along with learning resources 306 providing instruction, explanatory information, tutorials, and the like related to the content 304. The learning resources 306 may include text, video, images, interactive training content, quizzes and tests, or any other media or combination of media types suitable for delivering educational information, training materials, and the like to users of the content platform 302.

The system 300 may include a pre-trained model 308 such as a transformer-based neural language model pretrained on a large corpus of generic text data such as Wikipedia, online newspaper content, online encyclopedias, or the like. A number of suitable models are known in the art and available under various use licenses such as Bidirectional Encoder Representations from Transformers ("BERT"), available from Google, and GPT-2, available from OpenAI. This generic model may be trained over the content 304 and learning resources 306 hosted on the content platform 302 to create a domain-specific model 310.

The domain-specific model 310 may be used in turn to generate a global neural embedding 312 for the learning resources 306, and an unsupervised clustering algorithm or the like may be used to separate the learning resources 306 into clusters within the global neural embedding 312. The domain-specific model 310 may then be further tuned based on the resulting clusters to provide a number of cluster-specific models 314. Each of the learning resources 306 may then be fed into the domain-specific model 310 and its corresponding cluster-specific model 314, to provide two embeddings that can be concatenated to form a final embedding for a corresponding one of the learning resources 306. The resulting, final embeddings for the learning resources advantageously characterize the features of each learning resource within the entire content platform and a corresponding cluster of learning resources within the platform. A recommendation model 316 for the system 300 may be based on a transformer-based neural language model using the final embeddings for the domain-specific and cluster-specific embeddings.

For the content of a typical website, the recommendation model 316 may be prohibitively large, on the order of hundreds of millions of parameters or more. While such a model may usefully generate high-quality embeddings for learning resource recommendations offline, it may be impractical for use with a real time system that responds promptly to visitors of a website that highlight text of interest and await recommendations. In order to facilitate real time (or substantially real time) recommendations to users of the content platform 302 with little or no observable latency, a student model 318 may be trained to reproduce the behavior of the recommendation model 316 with significantly fewer parameters, and a significantly smaller number of layers. More specifically, the student model 318 may be trained to receive input text (e.g., as masked tokens), and output a probability distribution over all possible tokens for each masked token. This lightweight analog to the recommendation model 316 may be deployed on a website, and when a user selects text within the content 304, the student model 318 may compute the distance to all of the modeled learning resources 306 within an embedded space, and recommend a list of learning resources ranked in order of increasing distance to the highlighted text (e.g., with the closest text ranked highest in the recommendations). Thus, the student model 318 may generally receive a text selection 320 and generate one or more suggestions 322 including one or more suggested learning resources related to the highlighted text.

The process using these data structures is described in greater detail below. In general, the process may be deployed on a website to provide a user experience in which a user simply highlights or hovers over text of interest, and the website can make suggestions for learning resources that may be relevant to the highlighted text. The model may be updated from time to time, either on a schedule or in response to explicit content updates, so that recommendations usefully apply to a current version or the content 304 and learning resources 306 being viewed by a visitor to the content platform 302.

Figure 4:
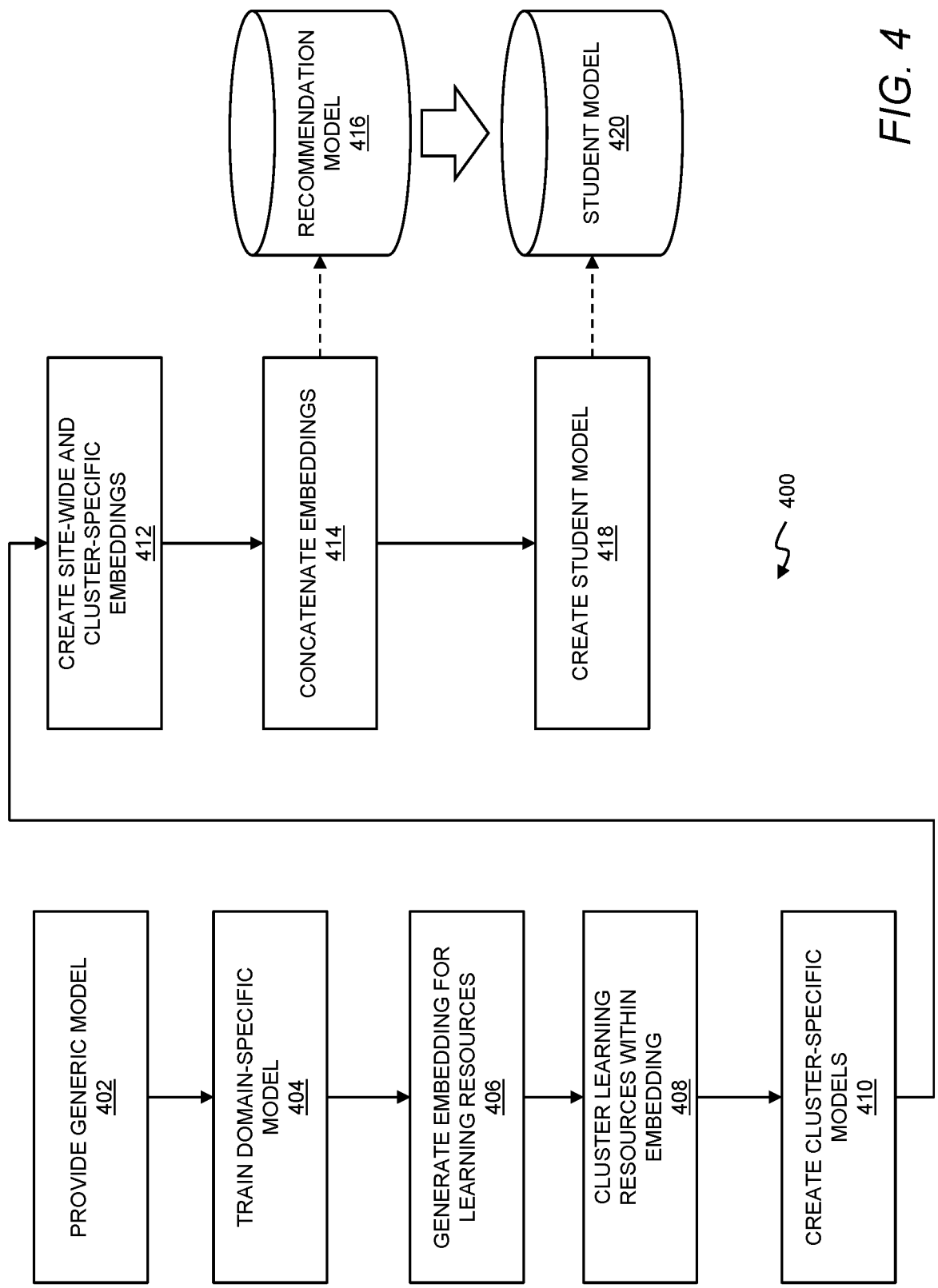
FIG. 4 shows a method for creating a recommendation system for learning resources.

FIG. 4 shows a method for creating a recommendation system for learning resources. In general, a suggestion engine such as a transformer-based neural language model may be trained over website content and related learning resources, and configured to respond to a user selection of text within the website content by generating suggestions for related learning resources. It will be appreciated that, while a transformer-based neural language model is a useful analytical tool for creating suggestions in this context, other models and techniques are also known in the art, and any such models that can similarly be trained to generate suitable recommendations in real time may also or instead be used with the systems and methods described herein.

As shown in step 402, the method 400 may begin with providing a generic language model. A variety of transformer-based neural language models are available that are pre-trained on a body generic text. For example, in order for a transformer model to learn words, grammar, structure, and other linguistic features, the model may be trained on large bodies of text, such as encyclopedias, online content, and so forth. For example, Google's BERT is a deeply bidirectional, unsupervised language representation trained on the plaintext of Wikipedia. As another example, OpenAI's GPT-2 model uses human curated/filtered content based on outbound links from Reddit. These and other commercially available pre-trained models may provide a useful starting point for natural language processing. More generally, a transform model may be pre-trained on any suitable corpus, and then fine-tuned as described herein for a task such as recommendations in a particular context using domain-specific data such as a website or other web content or the like.

As shown in step 404, the method may include training a domain-specific model, for example by providing the transformer-based neural language model that is pre-trained on a body of generic text as described above, and tuning the transformer-based neural language model into a domain-specific neural language model for content of the website. Thus in one aspect, training the domain-specific model may include training a site-wide neural language model for the website by creating a domain-specific neural language model trained over content for the website. More generally, training the site-wide neural language model may include adapting a generic language model to domain specific content for the website. The content may include a number of learning resources for a website, along with other content such as web pages or the like for the website. In one aspect, the content may include text content such as plain text within the website content. This provides a convenient medium that generally matches the training data for many natural language processing models and facilitates fine tuning of existing transformer-based natural language processing models. However, it will be understood that other web content may also or instead be used for model tuning, either with other models having embeddings based on images, video, audio, and other media, or by translating non-text content such as audio and images into plain text for purposes of model training.

As shown in step 406, the method 400 may include generating an embedding for the learning resources, such as by creating a word embedding for each one of the learning resources, or more generally, any global neural embedding for each one of the learning resources.

As shown in step 408, the method 400 may include clustering the learning resources into a number of clusters within the embedding. For example, this may include performing an unsupervised clustering algorithm to separate the learning resources into the number of clusters. A variety of techniques machine learning techniques are known for clustering, and suitable for use in an embedding such as a word embedding for website text. For example, techniques such as K-means clustering, means-shift clustering, expectation-maximization clustering using Gaussian mixture models, and agglomerative hierarchical clustering may be used to algorithmically identify clusters of adjacent data points within a multi-dimensional space such as a word embedding. In general, the number of clusters may be machine-learned, e.g., to maximize a silhouette value of the clustering algorithm. The actual number of clusters will depend on the specific characteristics of the website, and may range from three to twenty clusters for a typical website. Different clusters correspond to different topics (e.g., different categories of products and services) or structures (e.g., product manuals vs. tutorials). While it is not required for clusters or regions within an embedded space to have specific human-interpretable meanings, the clusters for a word embedded may usefully be organized around features such as topics (e.g., for different categories of products and services), learning resource formats (e.g., product manuals, tutorials, multimedia presentations, etc.), sources, length, authorship, and any other features that might usefully support suggestions for a user.

As shown in step 410, the method 400 may include creating cluster-specific models. For example, the site-wide neural language model may be separately tuned for each cluster based on one or more learning resources associated with the cluster. This results in a group of cluster-specific models including a separate model for each of the clusters.

Because transformer-based neural language models typically accept text of a fixed or limited length L (e.g., Bert model allows only 512 language tokens), and often the learning resources are longer than this fixed limit, each learning resource may usefully segmented into a number M of L-length token pieces, and these segments may be fed into the model, producing M neural embeddings. An optimization algorithm may then be used to learn M weights to combine the M embeddings into a weighted sum, generating a single embedding for each unit. This optimization algorithm may advantageously maximize a distance between the weighted sum and a mean of the embeddings of all texts, thus generating the most distinguishing embedding for the specific unit.

As shown in step 412, the method 400 may include creating site-wide and cluster specific embeddings. This may include feeding content of each of the learning resources (which may be segmented as described above to the extent necessary to conform to the chosen transformer-based neural model) to the site-wide neural language model and a corresponding one of the cluster-specific models, thereby providing a site-wide embedding and a cluster-specific embedding for each learning resource. For example, feeding each of the learning resources to the site-wide neural language model and a corresponding one of the cluster-specific models may include segmenting text of at least one of the learning resources into a number of tokens each within a predetermined length limit, generating a corresponding number of embeddings, and combining the corresponding number of embeddings into a weighted sum with an algorithm that maximizes a distance between the weighted sum and a mean of all embeddings for all content of the website.

As shown in step 414, the method 400 may include concatenating the site-wide embedding and the cluster-specific embedding for each of the learning resources. The resulting embedded space generally captures both the language characteristics of both the domain of the entire website and fine-grained subdomains within the website. More generally, this embedding may support a transformer-based neural model configured to receive a selection of content from the website and provide a probability distribution that one or more of the learning resources are relevant to the selection of content. These concatenated embeddings and the transformer-based neural model may be stored, e.g., as a recommendation model 416 that can suggest specific learning resources based on a selection of text within the website content. While it is generally contemplated that the learning resources are hosted with, and form a part of, the website, this is not strictly required. The learning resources may be third party resources, and/or may be remotely hosted, provided that the learning resources are available as, or can be converted into, a data set (e.g., plain text or the like) suitable for training a natural language processing model as described herein.

As shown in step 418, the method 400 may include creating a student model 420 to mirror the output of the recommendation model 416. For example, this may include configuring the student model 420 with fewer layers than the transformer-based neural model to output a similar or identical probability distribution that learning resources are relevant to selected text. The student model 420 may generally be used to provide suitable suggestions for learning resources in response to the selection of content, and may advantageously operate on a website in real time or near real time to provide useful recommendations.

The method 400 may be repeated as necessary or helpful to keep suggestions current with content and learning resources available for a website. Where the website includes a regular publication schedule, such as a daily or weekly periodical, the models may be updated on a corresponding schedule. Where updates to the website are on some other regular or irregular schedule, updates to the recommendation engine may be manually initiated by a website administrator, content generator, release management user, or the like. For example, a monthly update to the learning resources may be followed by an update to the transformer-based models. It will be noted that the steps described above are amenable to automation, including unsupervised clustering, so that the entire model update process may be performed automatically without human intervention. This advantageously facilitates updates to the models on any desired schedule consistent with available computing resources and the quantity and quality of changes to the website content (including the learning resources).

Figure 5:
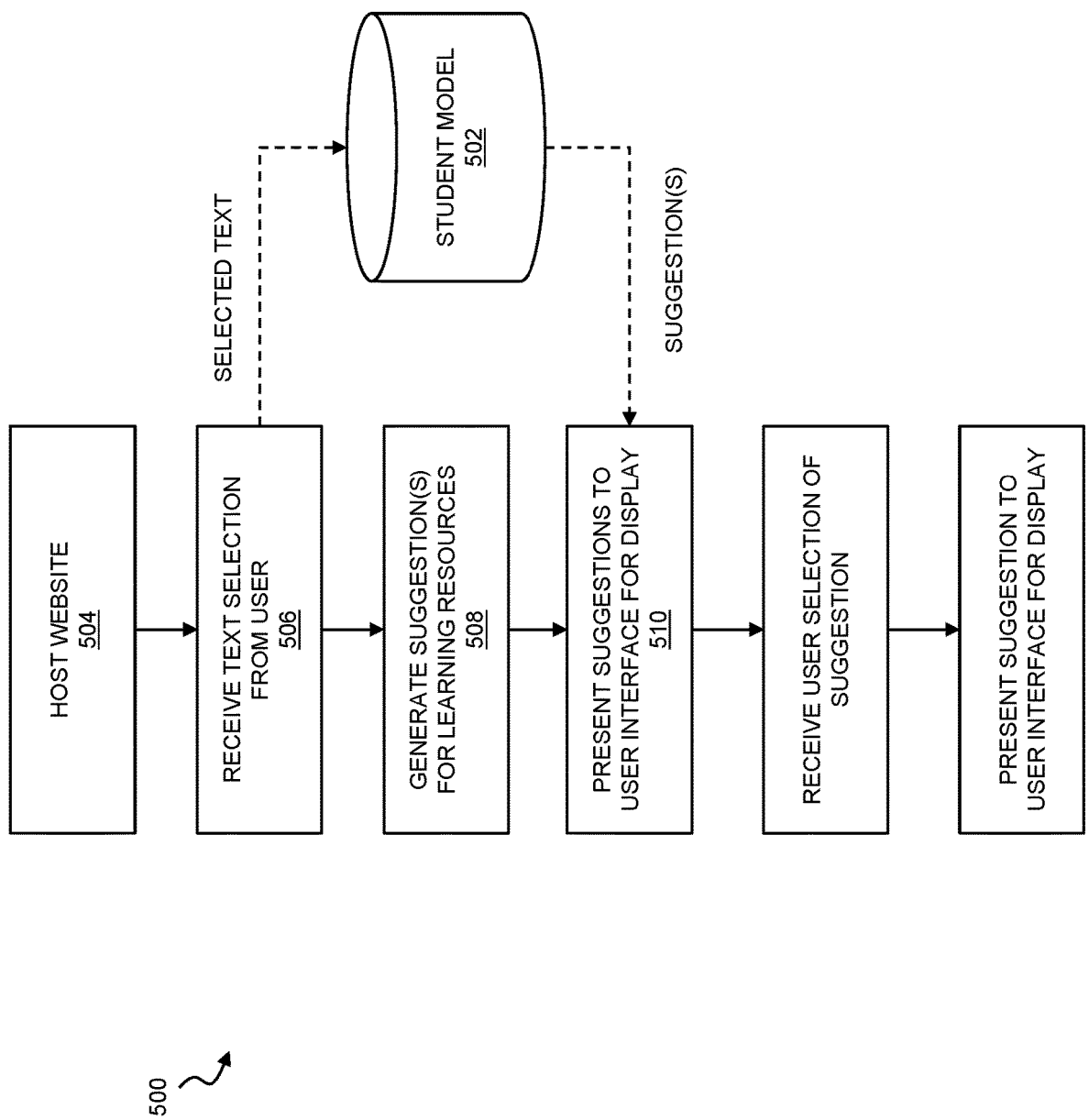
FIG. 5 shows a method for deploying a recommendation system for learning resources on a website.

FIG. 5 shows a method for deploying a recommendation system for learning resources on a website. In general, a student model 502 such as any of the models described above, may be deployed on a website and respond to user interactions with a displayed page such as a selection of text by providing one or more suggestions of learning resources related to the selected text.

As shown in step 504, the method 500 may include hosting a website. This may include any website available through a public network or a private network. The website may also or instead include public content available to any visitors, along with private content that is only available to credentialed visitors or the like who log in with a password or otherwise present identity information to the website for access.

As shown in step 506, the method 500 may include receiving a text selection from a user. This may, for example, include receiving a user selection in a user interface that displays content for the website containing the text selection. The selection may be performed, e.g., by highlighting or otherwise selecting a text segment, or by entering text from the website in a text input box or the like. However selected, the text may be forwarded to the student model 502 for the generation of suggestions of potentially relevant learning resources. In one aspect, the user interface may automatically generate suggestions in response to user highlighting. In another aspect, the user may initiate suggestions using a button, drop-down menu selection, website settings, or any other user controls accessible within or through a page of the website.

As shown in step 508, the method may include generating suggestions for learning resources, e.g., using the student model 502. As described above, the smaller, lightweight student model 502 may be trained to generate embeddings having the same dimensions as the embeddings of the learning resource units generated by the large teacher models, and therefore can be used to compute a relevance between user-highlighted text and learning resources. For example, a locality-sensitive hashing algorithm may be used to fast-compute a distance between highlighted text and each learning resource in real time, and the learning resources may be ranked in reverse order of distance to the highlighted text. Locality-sensitive hashing generally provides an algorithmic technique for hashing similar items into the same groups with high probability, e.g., where hash collisions are maximized, and/or where high-dimensionality items are reduced to lower dimensional items in a manner that preserves relative distances. Thus in one aspect, the method 500 may include providing a list of one or more of the learning resources in an order ranked by the student model according to relevance to the text section, e.g., based on distance in the embedded space, or more specifically ranked in an ascending order of distance in the embedded space, as described above.

As shown in step 510, the method 500 may include providing the list to a user by presenting the list for display in a user interface displaying a portion of the content for the website that includes the text selection. That is, in response to the user selecting a text segment, the website may, in real time or near real time, present one or more suggestions within the user interface, e.g., alongside the website content, on top of the website content, in a separate page, or in any other suitable manner viewable by the user.

According to the foregoing, there is described herein a system including a database, a server, a training engine, and a recommendation engine. The database may store a website having content that includes web pages and a number of learning resources, and the server may be coupled to the database and host the website for access through a network. In one aspect, the database and the server may be hosted in a multi-tenant database environment to advantageously support multiple enterprises, multiple users, multiple user types, multiple applications, and so forth while optimizing the cost, usage, and scalability of computing and database resources for multiple customers.

The training engine may, for example, be any of the recommendation models described above, and may be configured to train a student model by performing the steps of training a site-wide neural language model over content for the website, generating an embedding for the learning resources, clustering the learning resources into a number of clusters within the embedding, tuning the site-wide neural language model for each cluster based on one or more of the learning resources associated with the cluster to provide a group of cluster-specific models including a model for each of the clusters, feeding content of each of the learning resources to the site-wide neural language model and a corresponding one of the cluster-specific models to provide a site-wide embedding and a cluster-specific embedding for each learning resource, concatenating the site-wide embedding and the cluster-specific embedding for each of the learning resources to provide an embedded space for a transformer-based neural model configured to receive a selection of content from the website and provide a probability distribution that one or more of the learning resources are relevant to the selection of content, and configuring the student model to output the probability distribution in response to the selection of content with fewer layers than the transformer-based neural model, wherein the training engine dynamically updates the student model as the website changes.

The recommendation engine may be any of the student models described above, and may be configured to receive a text selection from a user of the website based on content for the website displayed to the user in a user interface, and to responsively provide a list of one or more of the learning resources to the user in the user interface in an order ranked according to relevance to the text selection by the student model.

Figure 6:
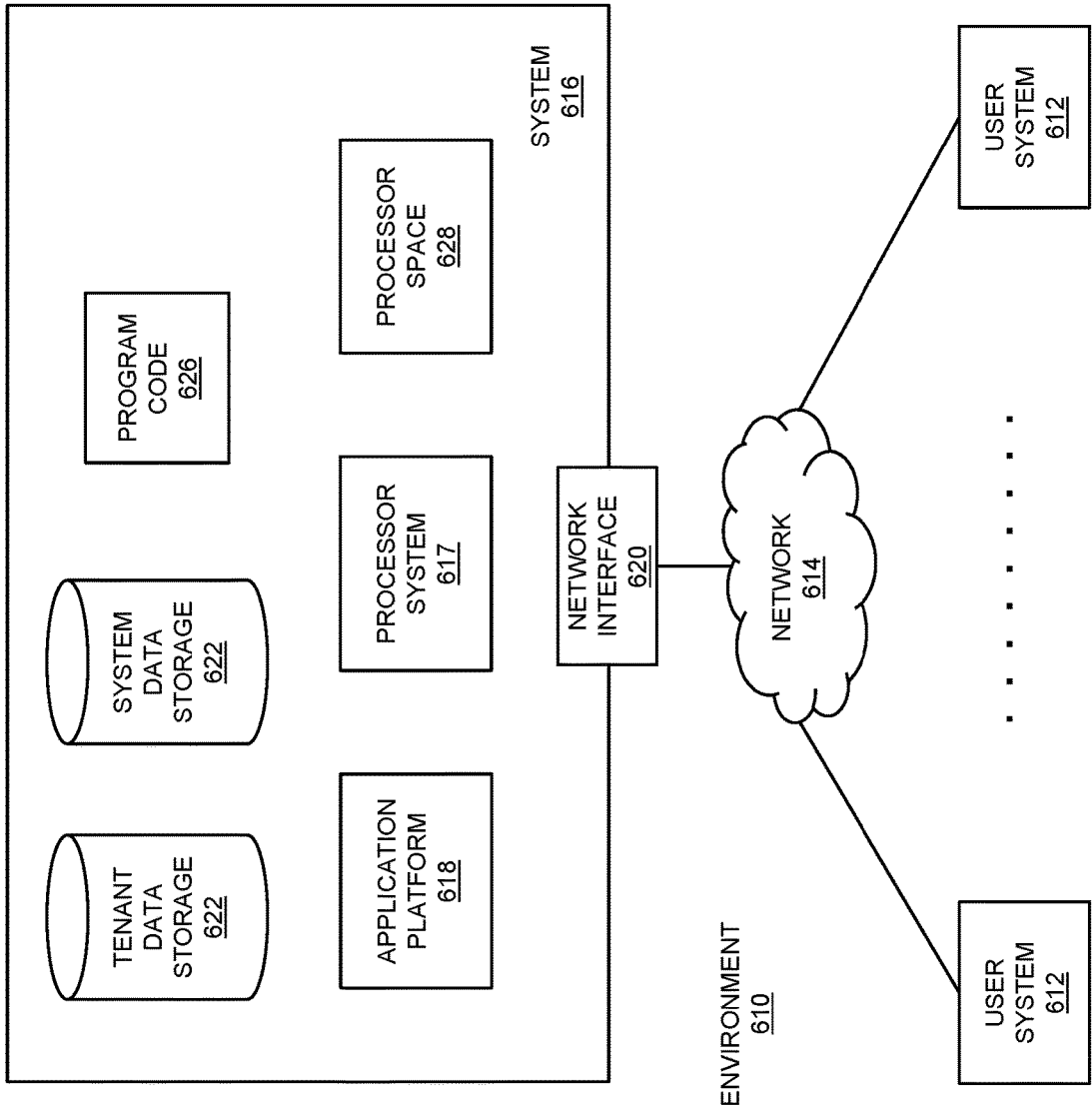
FIG. 6 illustrates a block diagram of an example of an environment wherein an on-demand database service might be used.

FIG. 6 illustrates a block diagram of environment 610 of an on-demand database service. While environment 610 illustrates an on-demand database service, the one or more implementations and techniques described herein are not limited to environment 610. For instance, embodiments may be implemented on other computing systems such as laptop, a tablet, a PDA, a desktop computer, a mobile device, a network system such as a LAN, a WAN, etc. Embodiments may also be practiced in other ways without departing from the scope of the embodiments.

Returning to FIG. 6, environment 610 may include one or more user devices 612, network 614, on-demand database service (ODDBS) 616, processor system 617, application platform 618, network interface 620, tenant data storage 622, system data storage 624 for system data 625 accessible by ODDBS 616, program code 626 for implementing various functions of ODDBS 616, and process space 628. In some embodiments, environment 610 may have other or different elements in addition to those listed above. In some embodiments, two or more of the elements discussed with respect to environment 610 may be combined into a single element. In some embodiments, one or more of the elements may be split into two or more separate elements within environment 610.

Figure 7:
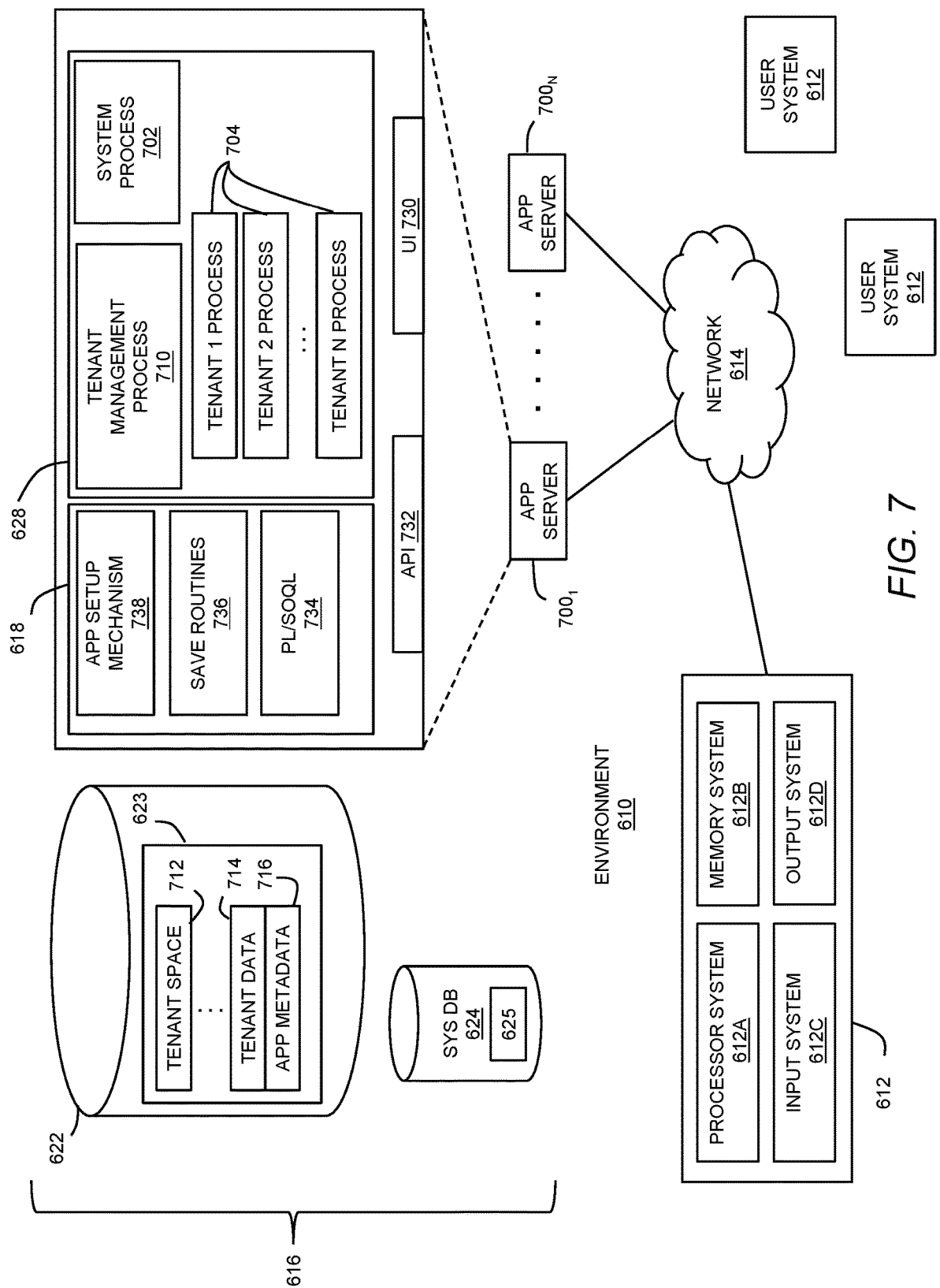
FIG. 7 illustrates a block diagram of an embodiment of elements of FIG. 6 and various possible interconnections between these elements.

User device 612 may be any machine or system used to access a database server. User device 612 can include a handheld computing device, a mobile phone, a laptop computer, a workstation, and a network of computing devices. An ODDBS 616 may be available for outside users when they need the database system. As illustrated in FIG. 6 and FIG. 7, user device 612 may interact via network 614 with ODDBS 616.

In some embodiments, ODDBS 616 may store information from one or more tenants in tables of a common database to form a multi-tenant database system (MTS). A relational database management system (RDMS) or the equivalent may execute storage and retrieval of information against the database object(s) stored in the database. Application platform 618 is a framework that enables ODDBS 616 providers, user device 612 users, or third-party application developers to create, manage or execute one or more applications on the ODDBS 616

Administrators of the ODDBS 616 may determine different permission levels for users of user devices 612 based on roles and privileges. For example, a salesperson using a particular user device 612 to interact with ODDBS 616 has the capacities allotted to that salesperson. An administrator using user device 612 to interact with ODDBS 616 has the capacities allotted to that administrator.

Network 614 is any network or combination of networks of devices that communicate with one another. For example, network 614 can be any one or any combination of a LAN, WAN, telephone network, wireless network, or other configurations. A TCP/IP network is an example network system that implements embodiments. Some implementations might use protocols other than TCP/IP, such as a UDP, IPX/SPX, AppleTalk, ICMP, etc.

User devices 612 may communicate with ODDBS 616 using application protocols such as HTTP. User device 612 may run a browser, such as an HTTP client, enabling a user to access, process and view information, pages, and applications via network 614. For example, the browser can be used to access data and applications hosted by ODDBS 616, and to perform searches on stored data, and otherwise allow a user to interact with various GUIs. In other embodiments, native applications operating on user devices 612 may be used as user interfaces to the ODDBS 616.

In one embodiment, ODDBS 616 implements a customer relationship management (CRM) system that includes application servers configured to implement CRM software applications. An MTS may store data for multiple tenants in the same physical database. However, data of different tenant typically are logically separate so that one tenant does not have access to another tenant's data, unless such data are expressly shared. In certain embodiments, ODDBS 616 implements applications other than a CRM application. Additional processes that may execute on ODDBS 616 include database indexing processes.

User device 612 and all of its components may be operator configurable using applications running on a CPU. Similarly, ODDBS 616, all of its components, and additional instances of an MTS might be operator configurable using applications executed by processor system 617. A computer program product embodiment includes a machine-readable storage medium having instructions stored thereon/in that can be used to program a computer to perform any of the embodiments' processes. Computer code for implementing embodiments in any programming language such as Java™, Apex®, C++, etc.

In an embodiment, the ODDBS 616 is configured to provide webpages, forms, applications, data and media content to user system 612 to support access by tenants of ODDBS 616. As such, ODDBS 616 provides security mechanisms to keep each tenant's data separate unless the data are shared. If more than one server within the ODDBS 616 is used, those servers may be in close proximity or distributed across geographical locations. As used herein, each MTS can include one or more logically and/or physically connected servers distributed locally or across one or more geographic locations. Similarly, the database object described herein can be implemented as single databases, a distributed database, a collection of distributed databases, a database with redundant online or offline backups or other redundancies, etc., and might include a distributed database or storage network and associated processing intelligence.

FIG. 7 further illustrates elements of system 610. User device 612 may include processor system 612A, memory system 612B, input system 612C, and output system 612D. ODDBS 616 may include tenant data storage 622, tenant data 623, system data storage 624, system data 625, User Interface (UI) 730, Application Program Interface (API) 732, PL/SOQL 734, save routines 736, application setup mechanism 738, applications servers 10001-1000N, system process space 702, tenant process spaces 704, tenant management process space 710, tenant storage area 712, user storage 714, and application metadata 716. In other embodiments, ODDBS 616 and/or user device 612 may not have the same elements as those listed above and/or may have other elements instead of, or in addition to, those listed above.

In FIG. 7, ODDBS 616 may include application servers 700. System process space 702 includes individual tenant process spaces 704 and a tenant management process space 710. The tenant data 623 might be divided into individual tenant storage areas 712, which can be either a physical arrangement or a logical arrangement of data. A UI 730 provides a user interface and an API 732 provides application programming interface to users and developers at user devices 612.

Application platform 618 includes an application setup mechanism 738 that supports application developers' creation and management of applications. Applications may be saved as metadata into tenant data storage 622 by save routines 736 for execution by subscribers as one or more tenant process spaces 704 managed by tenant management process 710. Invocations to such applications may be coded using PL/SOQL 34 that provides a programming language style interface extension to API 732. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations of applications may be detected by one or more system processes 702, which manage retrieving application metadata 716 for the subscriber making the invocation and executing the metadata as an application.

Application servers 700 may communicate with database systems via different network connections such as the Internet, direct network links. TCP/IP is the typical protocol for communicating between application servers 700 and the database systems. However, other transfer protocols, such as those mentioned above, may be used to optimize the network connection.

In certain embodiments, each application server 700 is configured to handle requests for any user associated with any organization that is a tenant. Preferably, a user or an organization has no server affinity for a specific application server 700*i*. In one embodiment, a load balancer is communicably coupled between the application servers 700 and the user devices 612. In this manner, ODDBS 616 is multi-tenant and handles storage of, and access to, different objects, data and applications across disparate users and organizations.

As an example of the use of ODDBS 616, one tenant might be a company that employs a sales force where each salesperson uses ODDBS 616 to manage their sales process. A user might maintain contact data, leads data, customer follow-up data, performance data, goals and progress data, etc., in tenant data storage 622. In a MTS arrangement, the user can manage his or her sales efforts and cycles from any of many different user systems.

While each user's data might be separate from other users' data, some data might be organization-wide and is shared or accessible by a plurality of users. Thus, some data in ODDBS 616 are managed at the tenant level while other data are managed at the user level. The MTS has security protocols that keep data, applications, and application use separate. ODDBS 616 might also maintain system level data usable by multiple tenants or other data, such as industry reports, news, and postings sharable among tenants. Also, the MTS can implement redundancy, up-time, and backup functions.

In certain embodiments, user devices 612 communicate with application servers 700 to request and update system-level and tenant-level data from ODDBS 616 that may require sending one or more queries. ODDBS 616 automatically generates the one or more SQL queries designed to access the requested data in the database.

Each database can generally be viewed as a collection of objects, such as a set of logical tables, containing data fitted into predefined categories. A "table" is one representation of a data object, and may be used herein to simplify the conceptual description of objects and custom objects. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. "Table," "object," and "entity" may be used interchangeably herein.

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

While one or more implementations and techniques are described with reference to an embodiment in which discovery and recommendation of online learning resources is implemented in a system providing a front end for an on-demand database service capable of supporting multiple tenants, the one or more implementations and techniques are not limited to multi-tenant databases. For instance, embodiments may be implemented on other computing systems such as laptop, a tablet, a PDA, a workstation, a mobile device, a network system such as a LAN, a WAN, etc. Embodiments may also be practiced using database architectures, such as ORACLE®, DB2® by IBM and the like without departing from the scope of the embodiments. The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y, and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the present teachings as defined by the following claims, which are to be interpreted in the broadest sense allowable by law.

What is claimed is:

1. A method comprising:
   training a site-wide neural language model for a website, the site-wide neural language model including a domain-specific neural language model trained over content for the website, the content including web pages and a number of learning resources;
   generating an embedding for the learning resources;
   clustering the learning resources into a number of clusters within the embedding;
   tuning the site-wide neural language model for each cluster based on one or more learning resources associated with the cluster, thereby providing a group of cluster-specific models including a model for each of the clusters;
   feeding content of each of the learning resources to the site-wide neural language model and a corresponding one of the cluster-specific models, thereby providing a site-wide embedding and a cluster-specific embedding for each learning resource;
   concatenating the site-wide embedding and the cluster-specific embedding for each of the learning resources, thereby providing an embedded space for a transformer-based neural model configured to receive a selection of content from the website and provide a probability distribution that one or more of the learning resources are relevant to the selection of content;
   configuring a student model with fewer layers than the transformer-based neural model to output the probability distribution in response to the selection of content;
   receiving a text selection from the content for the website; and
   providing a list of one or more of the learning resources in an order ranked according to relevance to the text selection by the student model.

2. The method of claim 1 wherein receiving the text selection includes receiving the text selection in a user interface displaying a portion of the content for the website that includes the text selection.

3. The method of claim 1 wherein providing the list includes presenting the list for display in a user interface displaying a portion of the content for the website that includes the text selection.

4. The method of claim 1 wherein training the site-wide neural language model includes providing a transformer-based neural language model pre-trained on a body of generic text and tuning the transformer-based neural language model into the domain-specific neural language model over the content for the website.

5. The method of claim 1 wherein training the site-wide neural language model includes adapting a generic language model to domain specific content for the website.

6. The method of claim 1 wherein the content includes text content.

7. The method of claim 1 wherein the embedding includes a global neural embedding for each one of the learning resources.

8. The method of claim 1 wherein the embedding includes a word embedding for each one of the learning resources.

9. The method of claim 1 wherein clustering includes performing an unsupervised clustering algorithm to separate the learning resources into the number of clusters.

10. The method of claim 1 wherein the number of clusters include at least one topic.

11. The method of claim 1 wherein the number of clusters include at least one learning resource format.

12. The method of claim 1 wherein feeding each of the learning resources to the site-wide neural language model and a corresponding one of the cluster-specific models includes segmenting text of at least one of the learning resources into a number of tokens each within a predetermined length limit, generating a corresponding number of embeddings, and combining the corresponding number of embeddings into a weighted sum with an algorithm that maximizes a distance between the weighted sum and a mean of all embeddings for all content of the web site.

13. The method of claim 1 wherein the student model calculates the probability distribution based on a distance between the text selection and each of the learning resources in the embedded space.

14. The method of claim 1 wherein the student model calculates the probability distribution using a locality-sensitive hashing algorithm.

15. The method of claim 1 wherein the learning resources are ranked in the list in an ascending order of distance in the embedded space.

16. A computer program product for recommending educational content comprising computer executable code embodied in a non-transitory computer readable medium that, when executing on one or more computing devices, performs the steps of:
   training a site-wide neural language model for a website, the site-wide neural language model including a domain-specific neural language model trained over content for the website, the content including web pages and a number of learning resources;

generating an embedding for the learning resources;

clustering the learning resources into a number of clusters within the embedding;

tuning the site-wide neural language model for each cluster based on one or more learning resources associated with the cluster, thereby providing a group of cluster-specific models including a model for each of the clusters;

feeding content of each of the learning resources to the site-wide neural language model and a corresponding one of the cluster-specific models, thereby providing a site-wide embedding and a cluster-specific embedding for each learning resource;

concatenating the site-wide embedding and the cluster-specific embedding for each of the learning resources, thereby providing an embedded space for a transformer-based neural model configured to receive a selection of content from the website and provide a probability distribution that one or more of the learning resources are relevant to the selection of content; and configuring a student model with fewer layers than the transformer-based neural model to output the probability distribution in response to the selection of content.

17. The computer program product of claim 16 further comprising code that performs the steps of receiving a text selection from the content for the website and providing a list of one or more of the learning resources in an order ranked according to relevance to the text selection by the student model.

18. The computer program product of claim 16 wherein the student model calculates the probability distribution based on a distance between the selection of content and each of the learning resources in the embedded space, and wherein the learning resources are ranked in a ranked list in ascending order of distance in the embedded space.

19. A system comprising:

a database storing a website having content that includes web pages and a number of learning resources;

a server coupled to the database and hosting the website for access through a network;

a training engine configured to train a student model by performing the steps of training a site-wide neural language model over content for the website, generating an embedding for the learning resources, clustering the learning resources into a number of clusters within the embedding, tuning the site-wide neural language model for each cluster based on one or more of the learning resources associated with the cluster to provide a group of cluster-specific models including a model for each of the clusters, feeding content of each of the learning resources to the site-wide neural language model and a corresponding one of the cluster-specific models to provide a site-wide embedding and a cluster-specific embedding for each learning resource, concatenating the site-wide embedding and the cluster-specific embedding for each of the learning resources to provide an embedded space for a transformer-based neural model configured to receive a selection of content from the website and provide a probability distribution that one or more of the learning resources are relevant to the selection of content, and configuring the student model to output the probability distribution in response to the selection of content with fewer layers than the transformer-based neural model, wherein the training engine dynamically updates the student model as the website changes; and a recommendation engine configured to receive a text selection from a user of the website based on content for the website displayed to the user in a user interface, and to responsively provide a list of one or more of the learning resources to the user in the user interface in an order ranked according to relevance to the text selection by the student model.

20. The system of claim 19 wherein the recommendation engine calculates the probability distribution using a locality-sensitive hashing algorithm.

* * * * *